US010996173B2

(12) United States Patent
Sobron

(10) Patent No.: US 10,996,173 B2
(45) Date of Patent: May 4, 2021

(54) NON-LINEAR METHODS FOR QUANTITATIVE ELEMENTAL ANALYSIS AND MINERAL CLASSIFICATION USING LASER-INDUCED BREAKDOWN SPECTROSCOPY (LIBS)

(71) Applicant: Pablo Sobron, Saint Louis, MO (US)

(72) Inventor: Pablo Sobron, Saint Louis, MO (US)

(73) Assignee: SETI INSTITUTE, Mountain View, CA (US)

(*) Notice: Subject to any disclaimer, the term of this patent is extended or adjusted under 35 U.S.C. 154(b) by 0 days.

(21) Appl. No.: 15/998,391

(22) Filed: Aug. 15, 2018

(65) Prior Publication Data

US 2019/0079019 A1    Mar. 14, 2019

Related U.S. Application Data

(60) Provisional application No. 62/545,746, filed on Aug. 15, 2017.

(51) Int. Cl.
| | | |
|---|---|---|
| *G01N 21/71* | (2006.01) | |
| *G01N 21/63* | (2006.01) | |
| *G01J 3/443* | (2006.01) | |
| *G01N 21/27* | (2006.01) | |
| *G01J 3/28* | (2006.01) | |

(52) U.S. Cl.
CPC ........... *G01N 21/718* (2013.01); *G01J 3/28* (2013.01); *G01J 3/443* (2013.01); *G01N 21/63* (2013.01); *G01N 21/27* (2013.01); *G01N 2201/1293* (2013.01)

(58) Field of Classification Search
None
See application file for complete search history.

(56) References Cited

U.S. PATENT DOCUMENTS

| | | | | |
|---|---|---|---|---|
| 2009/0247844 | A1* | 10/2009 | Pav ................... | A61B 5/14551 600/322 |
| 2011/0119212 | A1* | 5/2011 | De Bruin ............. | A61B 5/00 706/12 |
| 2012/0099103 | A1* | 4/2012 | Hahn ................... | G01N 21/718 356/316 |
| 2016/0181118 | A1* | 6/2016 | Kudou ................ | H01L 21/31116 438/718 |
| 2016/0334336 | A1* | 11/2016 | Aguilera Andoaga . | G01J 3/443 |
| 2016/0349174 | A1* | 12/2016 | Washburn ............ | G01N 21/272 |

(Continued)

OTHER PUBLICATIONS

Wikipedia, https://en.wikipedia.org/wiki/Laser-induced_breakdown_spectroscopy (Year: 2015).*

(Continued)

*Primary Examiner* — Hina F Ayub
(74) *Attorney, Agent, or Firm* — Goodwin Procter LLP

(57) ABSTRACT

Non-linear methods for quantitative elemental analysis and mineral classification using laser-induced breakdown spectroscopy are disclosed. According to one embodiment, a method, comprises calculating concentrations of elements in a sample using a laser-induced breakdown spectroscopy (LIBS) instrument. The LIBS instrument implements a kernel partial-least-squares regression (KPLSR) analysis. The method further comprises displaying the concentrations of the elements according to the KPLSR analysis.

20 Claims, 4 Drawing Sheets

(56) References Cited

U.S. PATENT DOCUMENTS

2017/0219494 A1* 8/2017 Li .................. G01N 21/718
2017/0234800 A1* 8/2017 Zhou ............... G01N 21/718
356/36

OTHER PUBLICATIONS

Anderson et al. ("Characterization of LIBS emission lines for the identification of chlorides, carbonates, and sulfates in salt/basalt mixtures for the application to MSL ChemCam data", J. Geophys. Res. Planets, 122, 744-770 (2017)) (Year: 2017).*

Bennett, K.P., et al.; "An Optimization Perspective on Kernel Partial Least Squares Regression", NATO Science Series III: Computer & Systems Sciences, vol. 190, IOS Press Amsterdam, (2003), pp. 227-250.

Rosipal, Roman, et al.; "Kernel Partial Least Squares Regression in Regression in Reproducing Kernel Hilbert Space", Journal of Machine Learing Research 2 (2001), pp. 97-123.

\* cited by examiner

NON-LINEAR METHODS FOR QUANTITATIVE ELEMENTAL ANALYSIS AND MINERAL CLASSIFICATION USING LASER-INDUCED BREAKDOWN SPECTROSCOPY (LIBS)

The present application claims the benefit of and priority to U.S. Provisional Patent Application Ser. No. 62/545,746 filed on Aug. 15, 2017 and entitled "METHODS FOR QUANTITATIVE ELEMENTAL ANALYSIS AND MINERAL CLASSIFICATION USING LASER-INDUCED BREAKDOWN SPECTROSCOPY (LIBS)," which is hereby incorporated by reference.

FIELD

The present disclosure relates in general to the field of instrumentation and elemental analysis systems, and in particular, to non-linear methods for quantitative elemental analysis and mineral classification using laser-induced breakdown spectroscopy.

BACKGROUND

Laser Induced Breakdown Spectroscopy (LIBS) is a method for detecting the presence of various elements in a sample by directing a high power emission from a laser onto the sample to form a plasma. The plasma is then analyzed spectroscopically to determine the composition of the sample. The LIBS technique offers promise as a method suitable for use with a soil penetrating probe to detect heavy metal contamination in soil, because it is highly sensitive and requires no sample preparation. Usually the LIBS technique involves delivery of the laser energy to the sample through air due to the high power densities required to ionize the sample.

In early LIBS experiments, high power laser beams were focused onto the surface of a sample using a system of lenses to generate a spark (plasma). Another assembly of lenses at a right angle to the laser beam then collected the spark light. Photomultiplier tubes with boxcar averagers, photodiode arrays with multichannel analyzers and, more recently, intensified charge coupled devices were used to record the emission signals. These LIBS experimental setups, however, are not well suited for industrial/field measurements where access to test facilities is limited and on-site alignments are difficult to complete.

Quantitative LIBS analysis and mineralogical identifications are complicated because the interaction of focused laser beams with solids is a very complex phenomenon which is not yet fully understood. A number of multivariate data analysis (MVA) methods have been used that enable relatively robust and accurate determinations of elemental abundances. MVA methods find combinations of fluctuation in the intensities of emission lines that are known to vary with the atomic fraction of different elements.

While these methods help mitigate some of the uncertainties that follow from our incomplete understanding of laser-matter interaction (matrix effects), they involve uncertainties of their own. Furthermore, the methods provide non-unique solutions for the chemical or spectral significance of certain latent variables and are prone to overfitting.

These difficulties purport to explain why large errors in the prediction of elemental abundances persist when matrix-specific MVA models like partial least squares (PLS) are used in different matrices. It has also been noted that MVA methods are not well suited for LIBS quantitative analysis over wide concentration ranges; nonlinear effects caused by self-absorption mechanisms in the plasma compromise their robustness and accuracy.

The dearth of effective quantification methods limits the scope of the investigations currently being carried out using LIBS. For example, minor and trace elements and elements with low-intensity lines such as hydrous and sulfate, can only be predicted within strict limits. These challenges limit the utilization of hydrous and sulfate emission lines for estimating the abundances of these two elements and for characterizing hydrous and sulfate-bearing materials.

Most common LIBS quantitative analytic methods use hard-modeling calibration procedures to generate calibration curves for one or several elements from the spectra of standard samples in a specific matrix, with each sample containing precisely known concentrations of the elements of interest. An alternative approach to the quantitative analysis is soft-modeling MVA methodologies such as PLS, principal component analysis (PCA), and soft independent modeling of class analogy (SIMCA). One of the recognized strengths of soft modeling is its ability to compensate for matrix effects. However, PCA, PLS, and SIMCA come with several inherent difficulties and are inadequate. Current methods for quantitative LIBS analysis and mineral classification require extensive calibration and supervision, and are inadequate for applications requiring accurate, precise, and fast analysis of materials.

SUMMARY

Non-linear methods for quantitative elemental analysis and mineral classification using laser-induced breakdown spectroscopy are disclosed. According to one embodiment, a method, comprises calculating concentrations of elements in a sample using a laser-induced breakdown spectroscopy (LIBS) instrument. The LIBS instrument implements a kernel partial-least-squares regression (KPLSR) analysis. The method further comprises displaying the concentrations of the elements according to the KPLSR analysis.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The accompanying figures, which are included as part of the present specification, illustrate the various embodiments of the presently disclosed system and method and together with the general description given above and the detailed description of the embodiments given below serve to explain and teach the principles of the present system and method.

Figure 1:
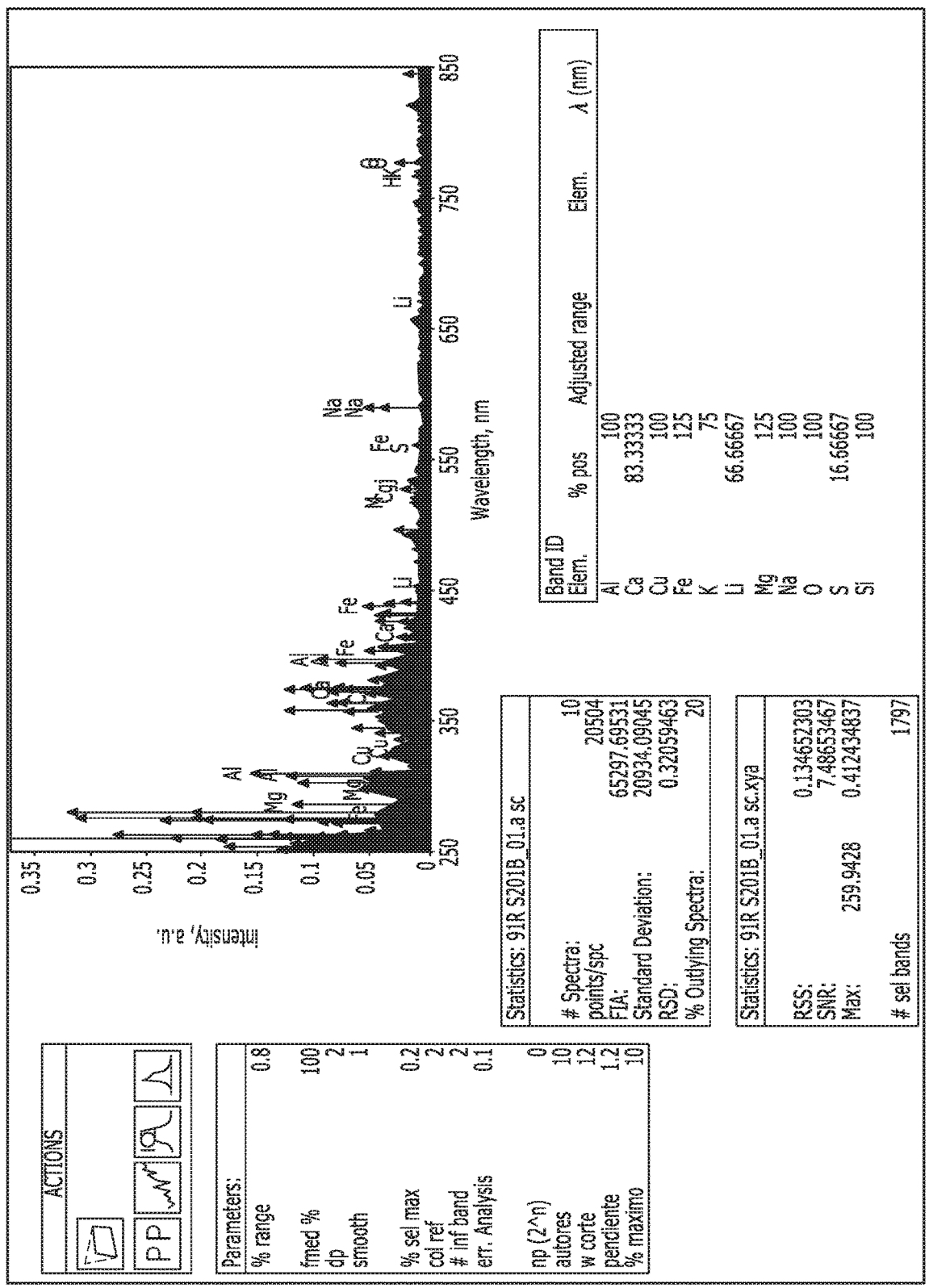
FIG. 1 illustrates an exemplary graphical user interface for LIBS data processing; according to one embodiment.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

Non-linear methods for quantitative elemental analysis and mineral classification using laser-induced breakdown spectroscopy are disclosed. According to one embodiment, a method, comprises calculating concentrations of elements in a sample using a laser-induced breakdown spectroscopy (LIBS) instrument. The LIBS instrument implements a kernel partial-least-squares regression (KPLSR) analysis. The method further comprises displaying the concentrations of the elements according to the KPLSR analysis.

The present method is a nonlinear procedure for quantitative and mineralogical analysis of LIBS data that enables onboard and in real-time analysis during geological prospecting and monitoring operations.

The present method advances the state of the art in the fields of natural resource exploration (mining, oil & gas) environmental monitoring, and construction. In addition, this technology could be spun-off for planetary exploration and in turn used by NASA and other space agencies. The present method may enable: (i) the development of other new techniques and methodologies based on this innovation; (ii) technological spin-offs that will not only constitute scientific advancements for the Earth, environmental, and planetary sciences, but will invite socially and economically beneficial industrial applications.

The present system uses kernel partial least squares regression (K-PLSR), a non-linear implementation of PLS, through kernel functions. The present system enables the calculation of chemical abundances in geological samples, cluster analysis that confirms whether a supposed grouping is actually present in the data, and mineral classification models that can be assessed visually. The present system accurately groups LIBS spectra from intraclass mixtures thus allowing for a first-order estimation of the relative abundances of phases in complex geological mixtures. The present system's K-PLSR model can also be used for quantitative LIBS analyses of complex geological mixtures.

The present method represents a rigorous account of the nonlinear effects of laser-matter interaction and plasma-atmosphere coupling in the dynamics and spectral emission of laser-induced plasmas of a broad range of materials and atmospheric conditions relevant for multiple applications on Earth and space. This detailed characterization provides a more complete dataset than existing ones because KPLSR is well equipped to handle the intrinsic nonlinearity and the structure of our experimental data products (simultaneous measurements of plasma dynamics and emission).

The present system utilizes novel quantitative LIBS methodologies that address the challenges of common MVA tools. K-PLSR is a non-linear PLS technique that does not entail non-linear optimization procedures (which are the basis of artificial neural networks (ANN), another approach to quantitative LIBS) because it efficiently computes regression coefficients in high-dimensional feature spaces by using kernel functions. As a consequence, it does not require the large diversity of training and calibration standards for accurate operation usually associated with ANN. The present system provides enhanced model generalization, i.e. more robust predictions from new data, and scalability to large datasets.

Note that while the present system uses a K-PLSR algorithm that is a non-linear implementation of PLS, the use of non-linear optimization is avoided through kernel functions. Thus, linear regressions are possible. For illustration purposes, the present system used a K-PLSR model for mixtures of reference sulfates, but it is applicable to other materials. The model demonstrate less than a 3% difference between real and modeled concentrations for multiple elements in a large collection of samples. The merit of this result lies in the fact that, despite the complexities introduced by the matrix effects associated with such mixtures, chemical abundances can be calculated with relative accuracy. This critical outcome is enabled by the ability of the present system's K-PLSR model to handle complex non-linear relationships among spectral features and the ability to detect all possible interactions between predictor variables.

The advantages of the new methodology are due to the fact that, in the present system's K-PLSR approach, all of the original spectral datapoints—which are multicollinear and are affected by the target's matrix as well as elemental composition—are nonlinearly mapped (kernelized) to a feature space where a linear PLS model is created. This way, the corresponding non-linear PLS model achieves superior generalization properties relative to linear PLS because it handles the physical non-linearities inherent to LIBS. The present system will facilitate the characterization of minerals.

The present method includes, but it is not limited to, models to analyze Mg- and Fe-sulfate and copiapite-, jarosite-, and alunite-group minerals; commercial synthetic and natural clay, phyllosilicate, carbonate and igneous rock samples; many major rock types and some mineral groups: olivines, basalts, dolomites, limestones, gypsums, as well as river, stream, and marine sediments; natural samples from the Qinghai-Tibet Plateau, the Atacama Desert, Rio Tinto, El Jaroso, Iron Mountain, and Svalbard terrestrial analogues—samples feature sulfates, carbonates, clays, phyllosilicates, oxy/hydroxides, igneous rocks, and mixtures thereof.

Figure 2:
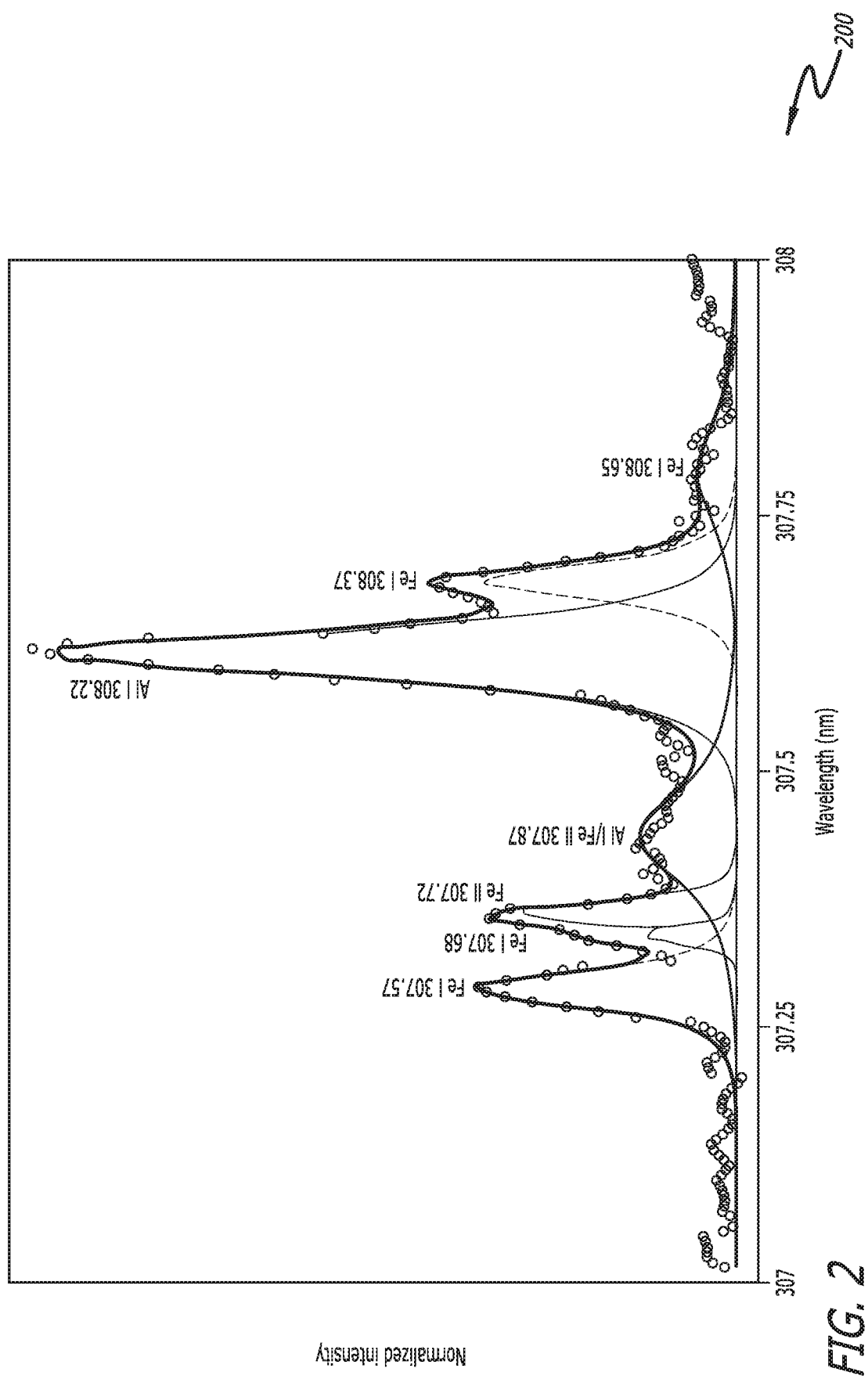
FIG. 2 illustrates an exemplary plot of peak fitting; according to one embodiment.

The present method uses spectral processing routines to process LIBS spectra. The routines determine the spectral parameters of certain lines of interest (LOI) associated to the presence and abundance of key elements in the plasma. These parameters are: line positions, line area, and line profile. FIG. 1 illustrates an exemplary graphical user interface 100 for LIBS data processing; according to one embodiment. FIG. 2 illustrates an exemplary plot 200 of peak fitting; according to one embodiment.

The present method calculates the abundance of elements in pure samples and complex mixtures. In addition it facilitates cluster analysis through the projection of principal components extracted by the kernelized model. Broadly, cluster analysis confirms whether a supposed grouping is actually present in the data, and facilitates the development of good classification models that can be assessed visually.

The PLSR model $Y=XA+B$, where A is the matrix of the regression coefficients and B stands for the matrix of residuals, is constructed from a training set consisting of n observations (LIBS samples) with N x-variables (parameters of LIBS LOI as explained above), and M y-variables (elemental abundance or mineral identity). Let X represent a n×N matrix of n N-dimensional inputs x and similarly let Y represent a n×M matrix of the corresponding n M-dimensional responses y. PLSR is based on the decomposition of the matrices X and Y into the following form $$X=TPT+E,$$

$$Y=UQT+F$$

where T and U are n×r matrices containing r latent vectors for n inputs, P and Q denote N×r and M×r matrices of weights (used to determine the linear combinations of inputs and responses, respectively) and the n×N and n×M matrices E and F represent matrices of residuals. The parameters of the decomposition are commonly determined by using the nonlinear iterative partial-least-squares (NIPALS) algorithm, which calculates the latent vectors t and u as well as the weight vectors p and q in such a way that the covariance between the X and Y matrices is maximized. (Note that the vectors t, u, p and q are columns of the matrices T, U, P and Q, respectively.) To extend the PLSR model (which accounts only for the second-order statistics in the data) to its nonlinear form (kernel partial-least-squares regression or KPLSR), a modification of the NIPALS algorithm based on the "kernel trick" exists, which avoids the calculation of the potentially computationally expensive nonlinear transformation $\phi$ (where $\phi$ denotes a nonlinear mapping of the N-dimensional input variable x from the input space RN to a high-dimensional feature space F, i.e., $\phi: x \in RN \rightarrow \phi(x) \in F$), and constructs the KPLSR model using the n×n kernel matrix $$K=[\phi(xi)\phi(xj)T]=[K(xi,xj)]; \forall i,j.$$

The NIPALS algorithm can be modified for use with such kernel matrices in two different ways: the first, is based on the same methodology as that used for deriving kernel PCA and the second, introduced in (Bennett and Embrechts, 2003), uses direct factorization of the kernel matrix to produce its low-rank approximation. Considering the latter approach, the NIPALS algorithm is modified as follows:
Input: Matrices Kc and Y
Output: r n-dimensional latent vectors t and u
1. Randomly initialize the y-latent vector u (usually the first column of Y).
2. Calculate the x-latent vector:
   t=KcKTcu, t←t/∥t∥.
3. Update the y-latent vector:
   u=KcKTct, u←u/∥u∥.
4. Repeat steps 2-3 until convergence (i.e., vector u in two consecutive iterations does not change).
5. Deflate the matrices Kc and Y:
   Kc=Kc−ttTKc, Y=Y−ttTY.
6. Orthonormalize the matrix Y: Y=Y(YTY)−1/2.
7. Continue with Step 2. using the new matrices Kc and Y.

Here Kc denotes the centered version of the kernel matrix K, i.e, $$Kc=(I-1/n1n1Tn)K(I-1/n1n1Tn)$$

where I represents an n-dimensional identity matrix and 1n stands for a vector of all ones, with length n.

The process is repeated until a sufficient number of latent vectors r is found. The present method employs cross-validation to determine the optimal number of latent vectors r that ensures good generalization capabilities of the resulting KPLSR model. After the matrices T and U are calculated, the predictions on N-dimensional inputs from the training set (matrix X) are made by $$Y^{\wedge}=KcA,$$

where Kc denotes the centered kernel matrix of the training data, $Y^{\wedge}$ denotes the matrix of the corresponding response estimates and $$A=KTcU(TTKcKTcU)-1TTY$$

represents the n×M matrix of the regression coefficients of the KPLS regression model. Similarly, the predictions on the (new, test, query) inputs X* are computed using $$Y^{\wedge *}=K^*cA,$$

where $$K^*c=(K^*-1/n1n^*1TnK)(I-1/n1n1Tn)$$

is the centered version of the kernel matrix K* of the inputs X*, n* denotes the number of (new) inputs (i.e., the number of columns in X*) and 1n* stands for a n*-dimensional vector of all ones.

In the present method three kinds of kernels are considered for the construction of the KPLSR model: the Gaussian or rbf kernel, the polynomial kernel and a fractional-power-polynomial model (fppm).

$$K(xi,xj)=e(\|xi-xj\|2/2\sigma2)$$

$$K(xi,xj)=(xTixj)d,$$

$$K(xi,xj)=\text{sign}(xTixj)(|xTixj|)z,$$

where $\sigma>0$, $d \in N+$ and $0<z<1$.

Figure 3:
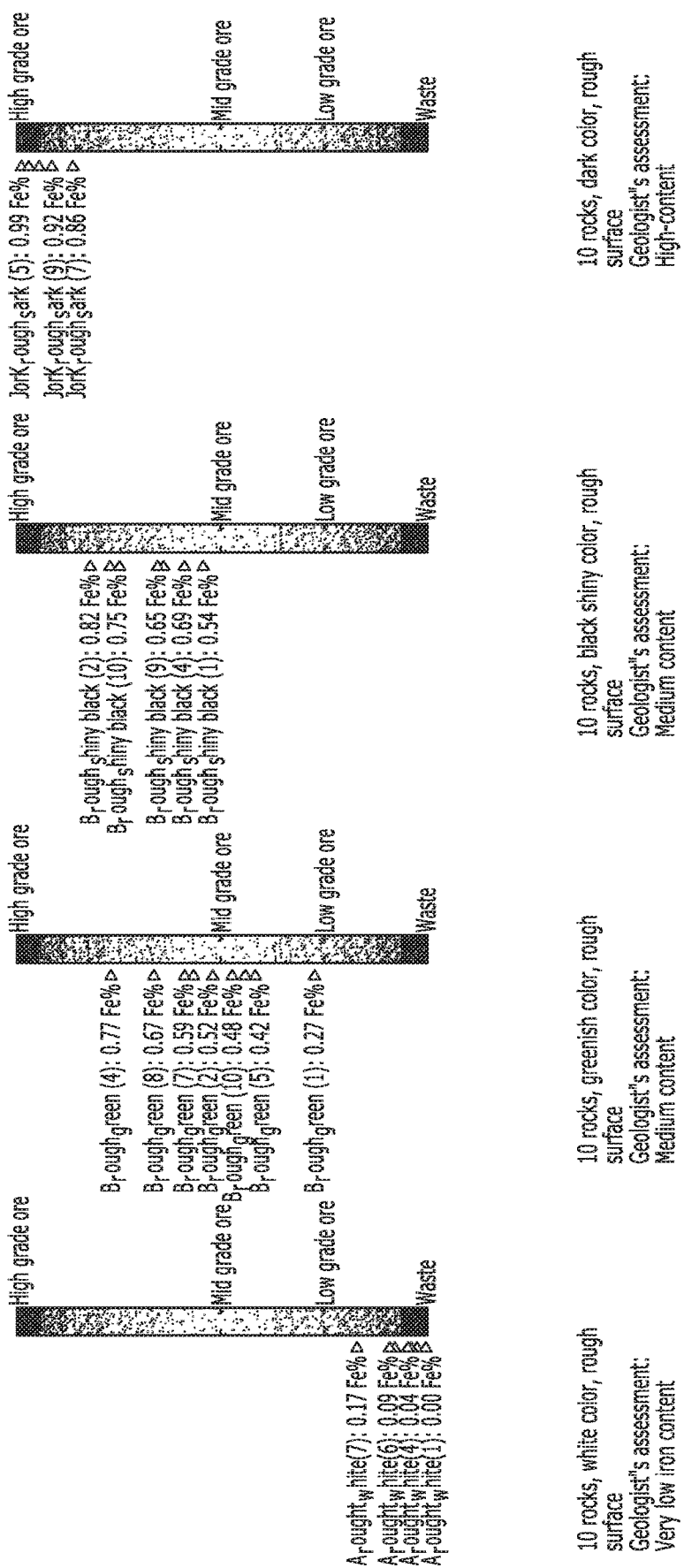
FIG. 3 illustrates an exemplary LIBS spectra analysis, according to one embodiment.

The present method may be implemented in a computer or instrument running an automated script that uses the present K-PLSR model to analyze LIBS spectra in real time and display element concentration (in wt %). FIG. 3 illustrates an exemplary LIBS spectra analysis 300, according to one embodiment.

Figure 4:
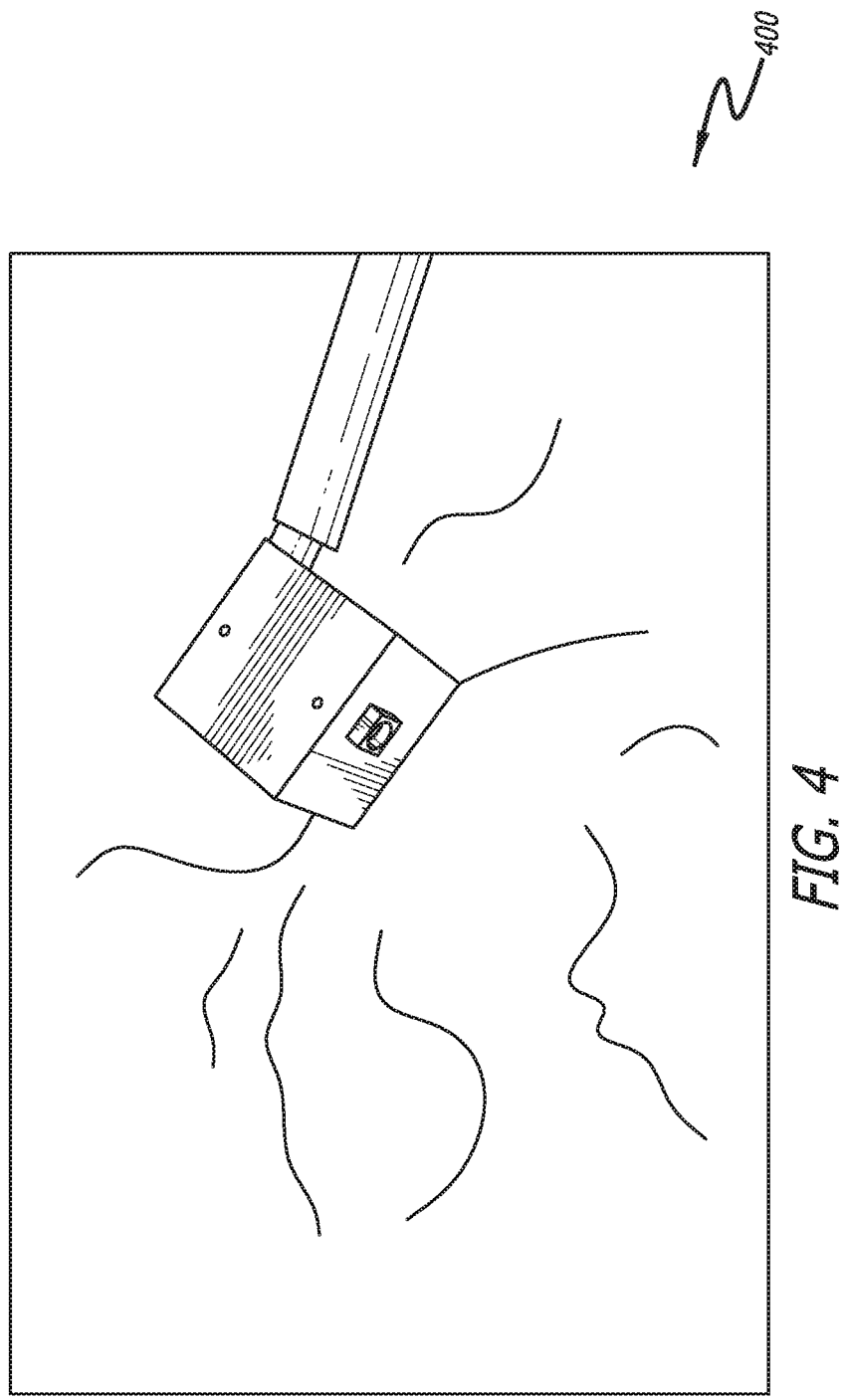
FIG. 4 illustrates an exemplary LIBS instrument, according to one embodiment.

FIG. 4 illustrates an exemplary LIBS instrument 400, according to one embodiment. LIBS instrument 400 that may include the present system is a miniature instrument developed for space exploration (e.g., ALPHEID). ALPHEID is an ultracompact laser-induced breakdown spectroscopy (LIBS) instrument that provides rapid, fine-scale chemistry, water abundance, and mineral classification. Mounted on a flyer, this instrument can cover broad areas at remote distances, and perform reconnaissance tasks, which will help prepare for and increase the efficiency of future human activity.

The present system overcomes a number of problems in obtaining consistent images from the plasma. For any given sample, the plasma properties, namely geometry (volume) and speed, were not repeatable pulse to pulse. The tremendous variability is due to at least two matrix effects within a specific sample and the fluctuations in experimental conditions. First, physical matrix effects. These are related to the physical properties of the target (e.g., grain size, surface roughness, absorptivity and thermal conductivity). Physical matrix effects complicate quantitative analysis with LIBS by causing uncontrolled random fluctuations in the plasma dynamics. Second, chemical matrix effects. These are related to the elemental and molecular compositions of the sample. They can result in higher emission from easily ionized elements existing in the matrix, thus affecting the expansion speed and plasma emission. As for the fluctuations in experimental conditions, they include pulse-to-pulse variations in the properties of laser beam (pulse frequency, pulse width, and energy density), variations in laser-to-sample optical path (e.g., accidental scatters), and variations in sample-to-collection optics optical path (including atmospheric effects). The latter two can be considered physical matrix effects as well, since they are mainly due to random effects in the laser ablation phase and contribute strongly to plasma properties by modifying the collection angles.

According to one embodiment, the present system analyzes LIBS data without the input from plasma dynamics information. According to another embodiment, the present system compensates for the aforementioned matrix effects and variations in experimental conditions using a parameter from the plasma. The present system calculates the total emission integrated intensity, or the total area under the spectrum in the 275-850 nm spectral range. Since the total collected emission integrated intensity represents approximately the total energy released by the plasma in every shot, this normalization helps correct for pulse-to-pulse variations in the laser energy, spot size, plasma geometry and brightness, collection geometry, and physical matrix effects in our experiments.

The present system considers a global metric for plasma volume, velocity, temperature, electron density, and spectral emission, for each sample. This metric represents an accurate account of the nonlinear effects of laser-matter interaction and plasma-atmosphere coupling in the dynamics and spectral emission of laser-induced plasmas of a broad range of materials and atmospheric conditions.

While the present disclosure has been described in terms of particular embodiments and applications, summarized form, it is not intended that these descriptions in any way limit its scope to any such embodiments and applications, and it will be understood that many substitutions, changes and variations in the described embodiments, applications and details of the method and system illustrated herein and of their operation can be made by those skilled in the art without departing from the scope of the present disclosure.

What is claimed is:

1. A method, comprising:
    calculating concentrations of elements in a sample using a laser-induced breakdown spectroscopy (LIBS) instrument, wherein the LIBS instrument implements a kernel partial-least-squares regression (KPLSR) analysis;
    calculating a total emission integrated intensity in a 275 nm to 850 nm spectral range, wherein the total emission integrated intensity is corrected for one or more of pulse-to-pulse variations in the laser energy, plasma brightness, and physical matrix effects; and
    displaying the concentrations of the elements according to the KPLSR analysis.

2. The method of claim 1, wherein the concentrations include a weight percentage of one or more of copiapite-group minerals, jarosite-group minerals, alunite-group minerals, clay, phyllosilicate, carbonate, igneous rock; olivines, basalts, dolomites, limestones, gypsums, river sediments, stream sediments, marine sediments, sulfates, carbonates, and oxy/hydroxides.

3. The method of claim 1, further comprising performing the method onboard and in real-time during geological prospecting and monitoring operations.

4. The method of claim 3, further comprising determining chemical abundances in geological samples.

5. The method of claim 3, further comprising performing cluster analysis to confirm whether a grouping is present in data.

6. The method of claim 3, further comprising determining spectral parameters of lines of interest (LOI) associated to chemical abundances of elements in the plasma.

7. The method of claim 6, wherein the spectral parameters include one or more of line positions, line area, and line profile.

8. The method of claim 3, further comprising nonlinearly mapping spectral datapoints to a feature space and generating a linear PLS model from the mapping.

9. The method of claim 3, further comprising determining a global metric for plasma volume, velocity, temperature, electron density, and spectral emission, for the sample.

10. The method of claim 1, wherein the total emission integrated intensity is corrected for one or more of spot size, plasma geometry, and collection geometry.

11. An apparatus, comprising an ultracompact laser-induced breakdown spectroscopy (LIBS) instrument that:
    calculates concentrations of elements in a sample;
    implements a kernel partial-least-squares regression (KPLSR) analysis;
    calculates a total emission integrated intensity in a 275 nm to 850 nm spectral range, wherein the total emission integrated intensity is corrected for one or more of pulse-to-pulse variations in the laser energy, plasma brightness, and physical matrix effects; and
    displays the concentrations of the elements according to the KPLSR analysis.

12. The apparatus of claim 11, wherein the concentrations include a weight percentage of one or more of copiapite-group minerals, jarosite-group minerals, alunite-group minerals, clay, phyllosilicate, carbonate, igneous rock; olivines, basalts, dolomites, limestones, gypsums, river sediments, stream sediments, marine sediments, sulfates, carbonates, and oxy/hydroxides.

13. The apparatus of claim 11, wherein the instrument operates in real-time during geological prospecting and monitoring operations.

14. The apparatus of claim 13, wherein the instrument determines chemical abundances in geological samples.

15. The apparatus of claim 13, wherein the instrument performs cluster analysis to confirm whether a grouping is present in data.

16. The apparatus of claim 13, wherein the instrument determines spectral parameters of lines of interest (LOI) associated to chemical abundances of elements in the plasma.

17. The apparatus of claim 16, wherein the spectral parameters include one or more of line positions, line area, and line profile.

18. The apparatus of claim 13, wherein the instrument nonlinearly maps spectral datapoints to a feature space and generating a linear PLS model from the mapping.

19. The apparatus of claim 13, wherein the instrument determines a global metric for plasma volume, velocity, temperature, electron density, and spectral emission, for the sample.

20. The apparatus of claim 11, wherein the total emission integrated intensity is corrected for one or more of spot size, plasma geometry, and collection geometry.

* * * * *